(12) United States Patent
Wang et al.

(10) Patent No.: US 11,713,097 B2
(45) Date of Patent: Aug. 1, 2023

(54) HARMONIC DRIVE SYSTEM FOR PEDAL ELECTRIC CYCLE

(71) Applicant: ZhuHai KwunHing Machinery & Electronic Co. Ltd., Zhuhai (CN)

(72) Inventors: Pei Yu Wang, Yuanlin (TW); Wei Sheng Ke, Keelung (TW)

(73) Assignee: ZHUHAI KWUNHING MACHINERY & ELECTRONIC CO. LTD., Zhuhai (CN)

(*) Notice: Subject to any disclaimer, the term of this patent is extended or adjusted under 35 U.S.C. 154(b) by 339 days.

(21) Appl. No.: 16/984,190

(22) Filed: Aug. 4, 2020

(65) Prior Publication Data
US 2021/0147034 A1  May 20, 2021

(30) Foreign Application Priority Data
Nov. 15, 2019  (TW) .................................. 108141641

(51) Int. Cl.
| | |
|---|---|
| B62M 11/02 | (2006.01) |
| B62M 6/40 | (2010.01) |
| F16H 49/00 | (2006.01) |
| F16D 41/00 | (2006.01) |
| B62M 6/90 | (2010.01) |
| F16H 1/14 | (2006.01) |
| F16H 1/16 | (2006.01) |
| F16H 37/04 | (2006.01) |

(52) U.S. Cl.
CPC .............. *B62M 11/02* (2013.01); *B62M 6/40* (2013.01); *B62M 6/90* (2013.01); *F16H 1/14* (2013.01); *F16H 1/16* (2013.01); *F16H 37/041* (2013.01); *F16H 49/001* (2013.01); *F16D 41/00* (2013.01)

(58) Field of Classification Search
CPC .......... B62M 11/02; B62M 6/40; B62M 6/55; F16D 41/00; F16D 41/24; F16H 29/00; F16H 29/12; F16H 31/00; F16H 31/001
See application file for complete search history.

(56) References Cited

U.S. PATENT DOCUMENTS

| | | | |
|---|---|---|---|
| 8,869,651 B2 * | 10/2014 | Yeh ........................... | F16H 1/10 74/640 |
| 9,284,998 B2 * | 3/2016 | Gießibl ................. | B62J 45/421 |
| 9,783,262 B2 * | 10/2017 | Dubose ............... | F16H 57/0476 |

(Continued)

*Primary Examiner* — Bobby Rushing, Jr.
(74) *Attorney, Agent, or Firm* — Bacon & Thomas, PLLC

(57) ABSTRACT

A harmonic drive system for a pedal-electric-cycle comprises a transmission gear device including a wave generator assembled by an elliptical cam and a flexible bearing, a flexible-flexspline, a rigid-circular-spline having rigid-circular-spline internal gear teeth, a gear set, and a one-way clutch having an inner surface defining a space for containing a spindle of the pedal-electric-cycle. A first end of the flexible-flexspline has flexible-flexspline external gear teeth for meshing with the rigid-circular-spline internal gear teeth and an inner surface defining a space for containing the wave generator. The gear set has a first input portion connected to a second end of the flexible-flexspline, a second input portion having an inner surface defining a space for containing the one-way clutch, and an output portion connected to a sprocket of the pedal-electric-cycle. The first input portion has a first-input rotational axis. The second input portion has a second-input rotational axis.

24 Claims, 11 Drawing Sheets

(56) References Cited

U.S. PATENT DOCUMENTS

| | | | | |
|---|---|---|---|---|
| 10,343,746 | B2* | 7/2019 | Doerndorfer | B62M 6/50 |
| 2015/0038289 | A1* | 2/2015 | Hino | B62M 6/40 |
| | | | | 477/5 |
| 2015/0247563 | A1* | 9/2015 | Yeh | F16H 49/001 |
| | | | | 74/640 |
| 2017/0313383 | A1* | 11/2017 | Uda | B62M 11/02 |
| 2018/0118304 | A1* | 5/2018 | Greven | B62M 3/003 |
| 2019/0210690 | A1* | 7/2019 | Huang | B62K 19/34 |

* cited by examiner

HARMONIC DRIVE SYSTEM FOR PEDAL ELECTRIC CYCLE

FIELD OF THE INVENTION

The present invention is related to a harmonic drive system for a pedal electric cycle, especially a drive system for a pedal electric cycle having a harmonic drive reducer.

BACKGROUND OF THE INVENTION

Please refer to FIG. 13, which shows a cross-sectional schematic view of an embodiment of planetary gear transmission apparatus of pedal electric cycle of the conventional technology. A planetary gear transmission apparatus 9 comprises an electric motor 92, a hollow shaft 93, a locking device 98, a ring gear 94, a sun wheel 96, three planet wheels 95, and a planet carrier 99. Please also refer to FIG. 14, which shows a schematic diagram of partial enlarged view of the embodiment in FIG. 13. The ring gear 94 has internal gear teeth and external gear teeth. The sun wheel 96 has external gear teeth. Each of the three planet wheels 95 has external gear teeth meshing with the internal gear teeth of the ring gear 94 and the external gear teeth of the sun wheel 96. The three planet wheels 95 are connected with the planet carrier 99, respectively. The external gear teeth of the ring gear 94 mesh with links of a chain 97 of a pedal electric cycle. A spindle 91 of the pedal electric cycle is routed through the hollow shaft 93 and fixedly connected to the planet carrier 99. The hollow shaft 93 is connected to the electric motor 92 and also connected to the sun wheel 96. The conventional technology uses the planetary gear transmission apparatus 9, which mainly has the disadvantages of relatively lower reduction ratio, heavier weight, larger volume, larger noise and lower transmission accuracy. Because of its lower reduction ratio and heavier weight, the power consumption required for the electric motor is larger, which in turn affects battery endurance. In addition, higher noise and lower transmission accuracy will affect the user's riding comfort. Moreover, the larger volume will affect the appearance of the aesthetic design of the pedal electric cycle.

Accordingly, the present invention has developed a new design which may avoid the above-described drawbacks, may significantly enhance the performance of the devices and may take into account economic considerations. Therefore, the present invention then has been invented.

SUMMARY OF THE INVENTION

The main technical problem that the present invention is seeking to solve is how to reduce the weight, volume, and noise of the drive system for the pedal electric cycle, and at the same time to raise the reduction ratio and to enhance the transmission accuracy of the pedal electric cycle, thereby improving battery endurance, enhancing comfort during riding, and enhancing the appearance of the aesthetic design.

In order to solve the above described problems and to achieve the expected effect, the present invention provides a harmonic drive system for a pedal electric cycle, wherein the harmonic drive system is arranged in a frame of the pedal electric cycle. The harmonic drive system comprises a transmission gear device. The transmission gear device comprises a wave generator, a flexible flexspline, a rigid circular spline, a gear set, and a first one-way clutch. The wave generator comprises an elliptical cam and a flexible bearing. The elliptical cam is arranged in a space defined by the inner ring surface of the flexible bearing such that the flexible hearing is deformed into elliptic cylindrical. The flexible flexspline has a first end and a second end. The first end of the flexible flexspline has flexible-flexspline external gear teeth and an inner ring surface. The wave generator is arranged in a space defined by the inner ring surface of the first end of the flexible flexspline such that the first end of the flexible flexspline is deformed into elliptic cylindrical. The rigid circular spline has rigid-circular-spline internal gear teeth provided for meshing with the flexible-flexspline external gear teeth. The gear set has a first input portion, a second input portion, and an output portion. The first input portion of the gear set is connected to the second end of the flexible flexspline. The second input portion of the gear set has an inner surface. The output portion of the gear set is provided for connecting to a sprocket of the pedal electric cycle. The first input portion of the gear set has a first-input rotational axis. The second input portion of the gear set has a second-input rotational axis. The first one-way clutch is arranged in a space defined by the inner surface of the second input portion of the gear set. The first one-way clutch has an inner surface. At least a portion of a spindle of the pedal electric cycle is arranged in a space defined by the inner surface of the first one-way clutch.

In an embodiment of the harmonic drive system for the pedal electric cycle, wherein the harmonic drive system further comprises a transmission motor apparatus. The transmission motor apparatus comprises an electric motor. The electric motor has a motor shaft. The elliptical cam is connected to the motor shaft.

In an embodiment of the harmonic drive system for the pedal electric cycle, wherein the harmonic drive system further comprises a rechargeable battery. The rechargeable battery is electrically connected to the transmission motor apparatus.

In an embodiment of the harmonic drive system for the pedal electric cycle, wherein the motor shaft has a motor-shaft rotational axis coincident with the first-input rotational axis.

In an embodiment of the harmonic drive system for the pedal electric cycle, wherein the wave generator, the flexible flexspline, and the rigid circular spline form a harmonic drive reducer. The harmonic drive reducer has a harmonic-drive-reducer rotational axis coincident with the first-input rotational axis.

In an embodiment of the harmonic drive system for the pedal electric cycle, wherein the transmission gear device further comprises a third one-way clutch. The elliptical cam has an inner surface. The third one-way clutch is arranged in a space defined by the inner surface of the elliptical cam. The elliptical cam is connected to the motor shaft through the third one-way clutch.

In an embodiment of the harmonic drive system for the pedal electric cycle, wherein the transmission gear device further comprises a third one-way clutch, wherein the elliptical cam has an inner surface. The third one-way clutch is arranged in a space defined by the inner surface of the elliptical cam.

In an embodiment of the harmonic drive system for the pedal electric cycle, wherein the harmonic drive system further comprises a housing. The housing is provided for containing the transmission gear device. The rigid circular spline is fixed at the housing.

In an embodiment of the harmonic drive system for the pedal electric cycle, wherein an angle between the first-input rotational axis and the second-input rotational axis is 90 degrees.

In an embodiment of the harmonic drive system for the pedal electric cycle, wherein the first-input rotational axis and the second-input rotational axis are parallel.

In an embodiment of the harmonic drive system for the pedal electric cycle, wherein the gear set comprises a first gear and a second gear. The first gear comprises first gear teeth and a first connecting shaft. The first input portion of the gear set is disposed at a first end of the first connecting shaft A second end of the first connecting shaft is connected to the first gear teeth. The second gear comprises second gear teeth and a second connecting shaft. The second input portion of the gear set is disposed at a first end of the second connecting shaft. The first end of the second connecting shaft is connected to the second gear teeth. The output portion of the gear set is disposed at a second end of the second connecting shaft. The first gear teeth of the first gear mesh with the second gear teeth of the second gear.

In an embodiment of the harmonic drive system for the pedal electric cycle, wherein the first-input rotational axis and the second-input rotational axis are non-parallel. A combination of the first gear teeth and the second gear teeth is one selected from the group consisting of: a combination of two bevel gears, a combination of two hypoid gears, a combination of a spur gear and a face gear, a combination of a worm wheel and a cylindrical worm, and a combination of a worm Wheel and a hourglass worm.

In an embodiment of the harmonic drive system for the pedal electric cycle, wherein the first-input rotational axis and the second-input rotational axis are parallel. A combination of the first gear teeth and the second gear teeth is one selected from the group consisting of: a combination of two spur gears, a combination of two helical gears, and a combination of a spur gear and an internal gear.

In an embodiment of the harmonic drive system for the pedal electric cycle, wherein the first-input rotational axis and the second-input rotational axis are parallel. The transmission gear device further comprises at least one third bearing. The second end of the first connecting shaft further comprises a connecting shaft protruding portion. The at least one third bearing has an inner ring surface. The connecting shaft protruding portion is arranged in a space defined by the inner ring surface of the at least one third bearing.

In an embodiment of the harmonic drive system for the pedal electric cycle, wherein the at least one third bearing is at least one selected from the group consisting of: a ball bearing, a roller bearing, and a needle bearing.

In an embodiment of the harmonic drive system for the pedal electric cycle, wherein the transmission gear device further comprises at least one first bearing. The at least one first bearing has an inner ring surface. At least a portion of the first connecting shaft of the first gear is arranged in a space defined by the inner ring surface of the at least one first bearing.

In an embodiment of the harmonic drive system for the pedal electric cycle, wherein the at least one first bearing is at least one selected from the group consisting of a ball bearing, a roller bearing, and a needle bearing.

In an embodiment of the harmonic drive system for the pedal electric cycle, wherein the flexible flexspline further comprises a fixing portion. The first gear further comprises a fixing portion. The at least one first bearing has an inner ring. The inner ring of the at least one first bearing is fixed between the fixing portion of the flexible flexspline and the fixing portion of the first gear.

In an embodiment of the harmonic drive system for the pedal electric cycle, wherein the transmission gear device further comprises at least one second bearing. The at least one second bearing has an inner ring surface. At least a portion of the second connecting shaft of the second gear is arranged in a space defined by the inner ring surface of the at least one second bearing.

In an embodiment of the harmonic drive system for the pedal electric cycle, wherein the at least one second bearing is at least one selected from the group consisting of: a ball bearing, a roller bearing, and a needle bearing.

In an embodiment of the harmonic drive system for the pedal electric cycle, wherein the transmission gear device further comprises a second one-way clutch. The second one-way clutch has an inner ring surface. There second end of the first connecting shaft is arranged in a space defined by the inner ring surface of the second one-way clutch. The first gear teeth have an inner ring surface. The second one-way clutch is arranged in a space defined by the inner ring surface of the first gear teeth.

In an embodiment of the harmonic drive system for the pedal electric cycle, wherein the second one-way clutch is one selected from the group consisting of a roller type one-way clutch and a sprag type one-way clutch.

In an embodiment of the harmonic drive system for the pedal electric cycle, wherein the wave generator, the flexible flexspline, and the rigid circular spline form a harmonic drive reducer. The harmonic drive reducer has a harmonic-drive-reducer rotational axis coincident with the first-input rotational axis.

In an embodiment of the harmonic drive system for the pedal electric cycle, wherein one end of the harmonic drive system close to the wave generator is disposed in a seat tube of the frame or a down tube of the frame; while the other end of the harmonic drive system distant from the wave generator is disposed in a bottom bracket of the frame.

In an embodiment of the harmonic drive system for the pedal electric cycle, wherein the first-input rotational axis and the second-input rotational axis are parallel. The harmonic drive system is disposed in a bottom bracket of the frame.

In an embodiment of the harmonic drive system for the pedal electric cycle, wherein the flexible flexspline has a cup shape. The first end of the flexible flexspline is a cup mouth of the cup shape. The second end of the flexible flexspline is a cup bottom of the cup shape.

In an embodiment of the harmonic drive system for the pedal electric cycle, wherein the transmission gear device further comprises a torque sensor. At least a portion of the torque sensor is arranged in a space defined by the inner surface of the first one-way clutch. The torque sensor has an inner surface, wherein the portion of the spindle of the pedal electric cycle is arranged in a space defined by the inner surface of the torque sensor.

For further understanding the characteristics and effects of the present invention, some preferred embodiments referred to drawings are in detail described as follows.

DETAILED DESCRIPTIONS OF PREFERRED EMBODIMENTS

Figure 1:
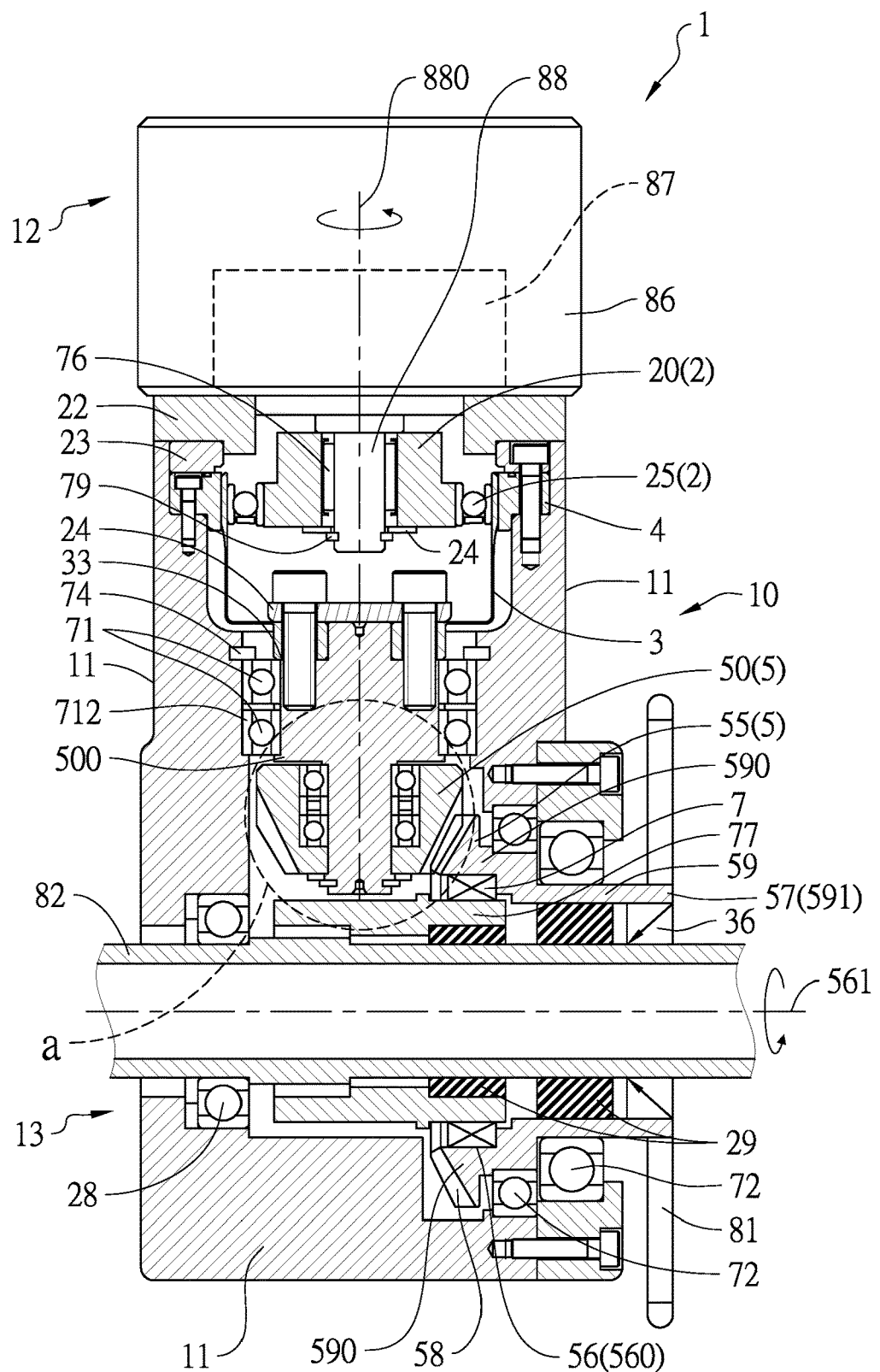
FIG. 1 is a cross-sectional schematic view of an embodiment of harmonic drive system for pedal electric cycle of the present invention.
Figure 2:
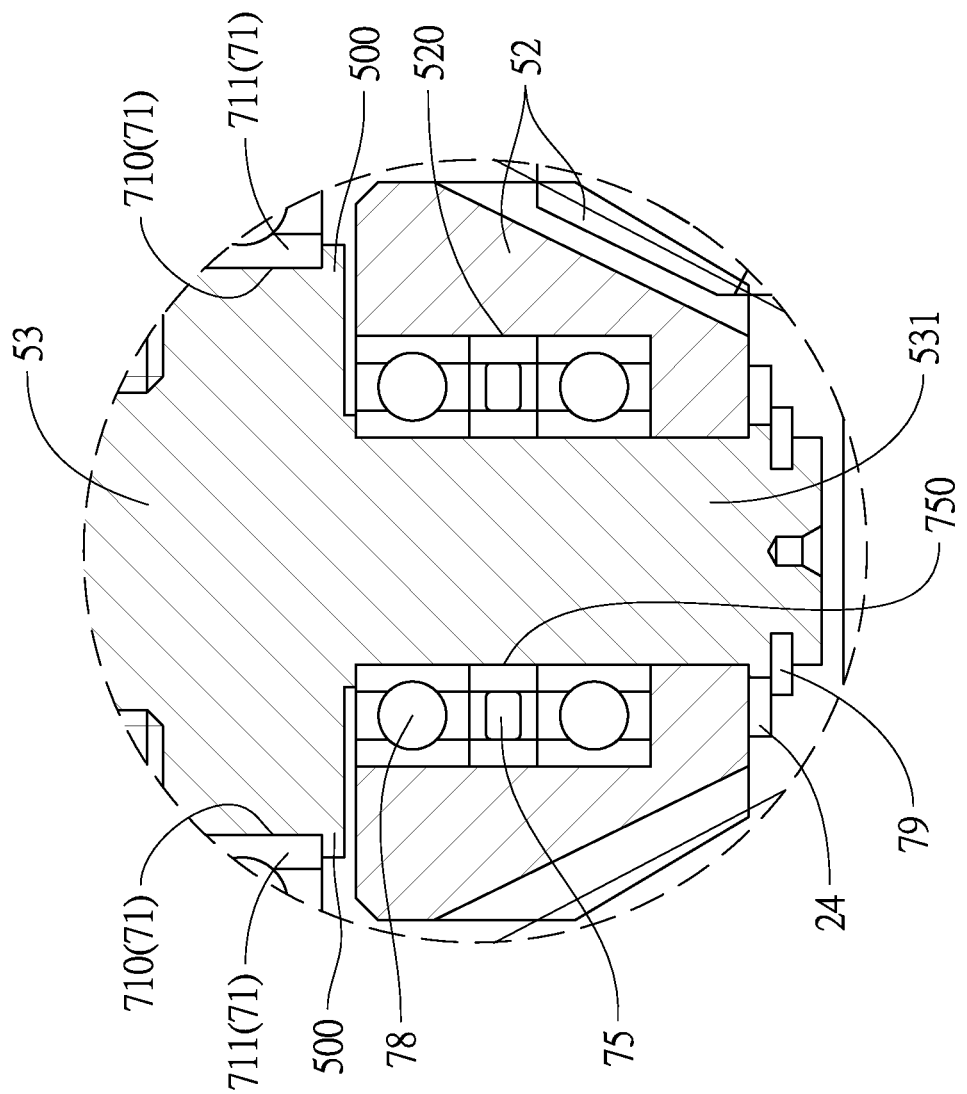
FIG. 2 is a schematic diagram of partial enlarged view (circular portion a) of the embodiment in FIG. 1.

Please refer to FIG. 1, which shows a cross-sectional schematic view of an embodiment of harmonic drive system for pedal electric cycle of the present invention. A harmonic drive system 1 for a pedal electric cycle of the present invention comprises a transmission gear device 10, a housing 11, and a transmission motor apparatus 86. The harmonic drive system 1 for the pedal electric cycle of the present invention is arranged in a frame 80 of the pedal electric cycle (please also refer to FIG. 6 or FIG. 7). The housing 11 is provided for containing the transmission gear device 10. The transmission motor apparatus 86 comprises an electric motor 87. The electric motor 87 is one selected from the group consisting of: a brushless DC motor and a brush DC motor. The electric motor 87 has a motor shaft 88. The motor shaft 88 rotates around a motor-shaft rotational axis 880. Please also refer to FIG. 2, which shows a schematic diagram of partial enlarged view (circular portion a) of the embodiment in FIG. 1. The transmission gear device 10 comprises a wave generator 2, a flexible flexspline 3, a rigid circular spline 4, a direction-changing gear set 5, a first one-way clutch 7, a second one-way clutch 75, a third one-way clutch 76, two first bearings 71, two second bearings 72, a torque sensor 77, an external circlip 74 and an internal circlip 79. The wave generator 2 comprises an elliptical cam 20 and a flexible bearing 25. Please also refer to FIG. 3, which shows an exploded perspective view of elliptical cam, flexible bearing, flexible flexspline and rigid circular spline of the embodiment in FIG. 1. The flexible bearing 25 has an inner "cylindrical" ring surface 26. The elliptical cam 20 is arranged in a space defined by the inner "cylindrical" ring surface 26 of the flexible bearing 25. When the elliptical cam 20 is arranged in the space defined by the inner "cylindrical" ring surface 26 of the flexible bearing 25 (that is that an outer "elliptic cylindrical" ring surface 200 of the elliptical cam 20 is in contact with the inner "cylindrical" ring surface 26 of the flexible bearing 25), the "cylindrical" flexible bearing 25 is deformed into elliptic cylindrical, so that the wave generator 2 is assembled by the elliptical cam 20 and the flexible bearing 25. The flexible flexspline 3 has a first end 31 and a second end 35. The flexible flexspline 3 has a cup shape. The first end 31 of the flexible flexspline 3 is a cup mouth of the cup shape. The second end 35 of the flexible flexspline 3 is a cup bottom of the cup shape. The first end 31 of the flexible flexspline 3 has flexible-flexspline external gear teeth 34 and an inner "cylindrical" ring surface 32. When the wave generator 2 is arranged in a space defined by the inner "cylindrical" ring surface 32 of the flexible flexspline 3 (that is that an outer "elliptic cylindrical" ring surface 27 of the "elliptic cylindrical deformed" flexible bearing 25 is arranged in the space defined by the inner "cylindrical" ring surface 32 of the flexible flexspline 3), the "cylindrical" first end 31 of the flexible flexspline 3 is deformed into elliptic cylindrical. The rigid circular spline 4 has rigid-circular-spline internal gear teeth 40 provided for meshing with the flexible-flexspline external gear teeth 34. The rigid circular spline 4 is fixed at the housing 11. Please also refer to FIG. 4, which shows an assembled top view of elliptical cam, flexible bearing, flexible flexspline and rigid circular spline of the embodiment in FIG. 3. The wave generator 2 (including the elliptical cam 20 and the flexible bearing 25), the flexible flexspline 3, and the rigid circular spline 4 form a harmonic drive reducer 45. The elliptical cam 20 has an inner surface 21. The third one-way clutch 76 is arranged in a space defined by the inner surface 21 of the elliptical cam 20. The third one-way clutch 76 has an inner surface 760. At least a portion of the motor shaft 88 is arranged in a space defined by the inner surface 760 of the third one-way clutch 76 (the third one-way clutch 76 is connected to the motor shaft 88). The internal circlip 79 can fix the connection between the motor shaft 88, the third one-way clutch 76, and the elliptical cam 20 so as to prevent axial displacement. A washer 24 may further be added when using the internal circlip 79. The harmonic drive reducer 45 rotates around a harmonic-drive-reducer rotational axis 46. The harmonic-drive-reducer rotational axis 46 is coincident with the motor-shaft rotational axis 880. Please also refer to FIG. 5, which shows an exploded perspective view of flexible flexspline, first gear and second gear of the embodiment in FIG. 1. The direction-changing gear set 5 comprises a first gear 50 and a second gear 55. The first gear 50 comprises first gear teeth 52 and a first connecting shaft 53. The second gear 55 comprises second gear teeth 58 and a second connecting shaft 59. The direction-changing gear set 5 has a first input portion 51, a second input portion 56, and an output portion 57. The first input portion 51 of the direction-changing gear set 5 is disposed at a first end 530 of the first connecting shaft 53. A second end 531 of the first connecting shaft 53 is connected to the first gear teeth 52. The first gear teeth 52 have an inner ring surface 520. In current embodiment, each of the fourth bearings 78 has an inner ring surface 780. The second one-way clutch 75 has an inner ring surface 750. Firstly, the second end 531 of the first connecting shaft 53 is arranged in two spaces defined respectively by the inner ring surfaces 780 of the two fourth bearings 78 and a space defined by the inner ring surface 750 of the second one-way clutch 75. Then, the two fourth bearings 78 and the second one-way clutch 75 are arranged in a space defined by the inner ring surface 520 of the first gear teeth 52. The first input portion 51 of the direction-changing gear set 5 (the first end 530 of the first connecting shaft 53) is connected to the second end 35 of the flexible flexspline 3. The second input portion 56 of the direction-changing gear set 5 is disposed at a first end 590 of the second connecting shaft 59. The second input portion 56 of the direction-changing gear set 5 has an inner surface 560. The first one-way clutch 7 is arranged in a space defined by the inner surface 560 of the second input portion 56 of the direction-changing gear set 5. The first end 590 of the second connecting shaft 59 is connected to the second gear teeth 58. The first gear teeth 52 of the first gear 50 mesh with the second gear teeth 58 of the second gear 55. The output portion 57 of the direction-changing gear set 5 is disposed at a second end 591 of the second connecting shaft 59. The output portion 57 of the direction-changing gear set 5 (the second end 591 of the second connecting shaft 59) is provided for connecting to a sprocket 81 of the pedal electric cycle. The first one-way clutch 7 has an inner surface. At least a portion of the torque sensor 77 is arranged in a space defined by the inner surface of the first one-way clutch 7. The torque sensor 77 has an inner surface. At least a portion of a spindle 82 of the pedal electric cycle is arranged in a space defined by the inner surface of the torque sensor 77. In addition, a bearing 28 and a copper sleeve 29 may further be used such that at least a portion of the spindle 82 is arranged in the space defined by the inner surface of the torque sensor 77, a space defined by an inner ring surface of the bearing 28, and a space defined by an inner ring surface of the copper sleeve 29. Therefore, the rotation of the spindle 82 is more stable and axial displacement is prevented. The first input portion 51 of the direction-changing gear set 5 (the first end 530 of the first connecting shaft 53) rotates around a first-input rotational axis 510. The second input portion 56 of the direction-changing gear set 5 (the first end 590 of the second connecting shaft 59) rotates around a second-input rotational axis 561. The first-input rotational axis 510 is coincident with the harmonic-drive-reducer rotational axis 46 and also coincident with the motor-shaft rotational axis 880. An angle between the first-input rotational axis 510 and the second-input rotational axis 561 is 90 degrees (non-parallel). The flexible flexspline 3 further comprises a fixing portion 33. The first gear 50 further comprises a fixing portion 500 (disposed at the first connecting shaft 53). Each of the first bearings 71 has an inner ring surface 710, an inner ring 711, and an outer ring 712. Before the first input portion 51 of the direction-changing gear set 5 (the first end 530 of the first connecting shaft 53) is connected to the second end 35 of the flexible flexspline 3, a portion of the first connecting shaft 53 between the first input portion 51 of the direction-changing gear set 5 (the first end 530 of the first connecting shaft 53) and the fixing portion 500 may be arranged in two spaces defined respectively by the inner ring surfaces 710 of the two first bearings 71; and then the first input portion 51 of the direction-changing gear set 5 (the first end 530 of the first connecting shaft 53) may be connected to the second end 35 of the flexible flexspline 3. Therefore, the inner rings 711 of the two first bearings 71 are fixed between the fixing portion 33 of the flexible flexspline 3 and the fixing portion 500 of the first gear 50. The axial displacement of the two first bearings 71 may be prevented. The washer 24 may further be added for the connection between the first input portion 51 of the direction-changing gear set 5 (the first end 530 of the first connecting shaft 53) and the second end 35 of the flexible flexspline 3. The outer rings 712 of the two first bearings 71 are fixed at the housing 11 by the external circlip 74, so at to prevent axial displacement of the two first bearings 71. The first bearing 71 is at least one selected from the group consisting of: a ball bearing, a roller bearing, and a needle bearing, wherein the ball bearing may be a deep groove ball bearing. Each of the second bearings 72 has an inner ring surface. At least a portion of the second connecting shaft 59 of the second gear 55 is arranged in two spaces defined respectively by the inner ring surfaces of the two second bearings 72. The second bearing 72 is at least one selected from the group consisting of: a ball bearing, a roller bearing, and a needle bearing, wherein the ball bearing may be a deep groove ball bearing. A sealing element 36 may further be used for sealing a gap between the spindle 82 and the output portion 57 of the direction-changing gear set 5 (the second end 591 of the second connecting shaft 59).

Figure 6:
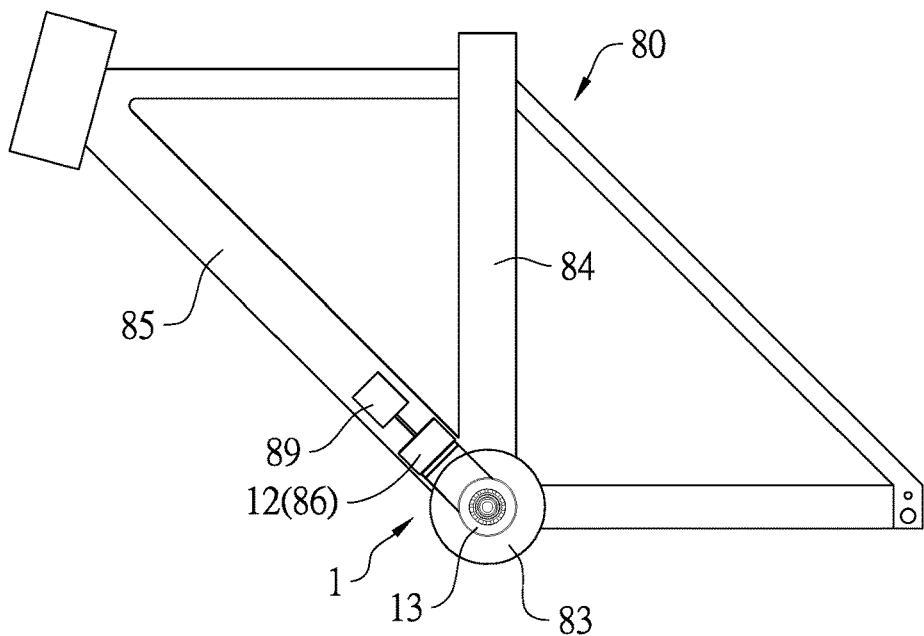
FIG. 6 is a cross-sectional schematic view of an embodiment of harmonic drive system for pedal electric cycle arranged in a frame of pedal electric cycle of the present invention.

Please refer to FIG. 6, which shows a cross-sectional schematic view of an embodiment of harmonic drive system for pedal electric cycle arranged in a frame of pedal electric cycle of the present invention. In current embodiment, the harmonic drive system 1 for the pedal electric cycle further comprises a battery 89, wherein the battery 89 is electrically connected to the transmission motor apparatus 86. The battery 89 may be a rechargeable battery. One end 12 of the harmonic drive system 1 for the pedal electric cycle close to the wave generator 2 is disposed in a down tube 85 of the frame 80; while the other end 13 of the harmonic drive system 1 for the pedal electric cycle distant from the wave generator 2 is disposed in a bottom bracket 83 of the frame 80; wherein the battery 89 is disposed in the down tube 85 of the frame 80. In some other embodiments (not shown), one end 12 of the harmonic drive system 1 for the pedal electric cycle close to the wave generator 2 is disposed in the down tube 85 of the frame 80; while the other end 13 of the harmonic drive system 1 for the pedal electric cycle distant from the wave generator 2 is disposed in the bottom bracket 83 of the frame 80; wherein the battery 89 is disposed in a seat tube 84 of the frame 80.

Figure 7:
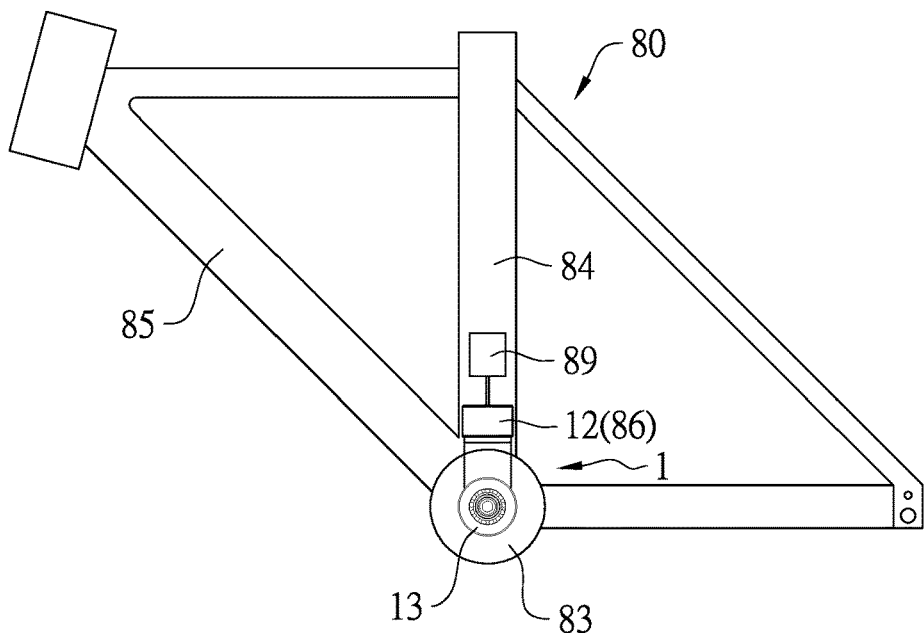
FIG. 7 is a cross-sectional schematic view of another embodiment of harmonic drive system for pedal electric cycle arranged in a frame of pedal electric cycle of the present invention.

Please refer to FIG. 7, which shows a cross-sectional schematic view of another embodiment of harmonic drive system for pedal electric cycle arranged in a frame of pedal electric cycle of the present invention. In current embodiment, the harmonic drive system 1 for the pedal electric cycle further comprises a battery 89, wherein the battery 89 is electrically connected to the transmission motor apparatus 86. The battery 89 may be a rechargeable battery. One end 12 of the harmonic drive system 1 for the pedal electric cycle close to the wave generator 2 is disposed in the seat tube 84 of the frame 80; while the other end 13 of the harmonic drive system 1 for the pedal electric cycle distant from the wave generator 2 is disposed in the bottom bracket 83 of the frame 80; wherein the battery 89 is disposed in the seat tube 84 of the frame 80. In some other embodiments (not shown), one end 12 of the harmonic drive system 1 for the pedal electric cycle close to the wave generator 2 is disposed in the seat tube 84 of the frame 80; while the other end 13 of the harmonic drive system 1 for the pedal electric cycle distant from the wave generator 2 is disposed in the bottom bracket 83 of the frame 80; wherein the battery 89 is disposed in the down tube 85 of the frame 80.

The harmonic drive system 1 for pedal electric cycle of the present invention uses the direction-changing structure and the reducer structure of the direction-changing gear set 5 (including two bevel gears: the first gear 50 and the second gear 55) combining with the reducer structure of the harmonic drive reducer 45. It can significantly reduce the volume and the weight of the harmonic drive system 1 for the pedal electric cycle. Furthermore, the harmonic drive system 1 for the pedal electric cycle can be designed and arranged in the seat tube 84 and the bottom bracket 83 of the frame 80 of the pedal electric cycle or in the down tube 85 and the bottom bracket 83 of the frame 80 of the pedal electric cycle. The design may significantly reduce the volume of the harmonic drive system 1 for the pedal electric cycle within the bottom bracket 83, therefore, the flexibility of the design and the configuration of the spindle 82 of the pedal electric cycle, the torque sensor 77, the first one-way clutch 7, and other components may be improved. Compared with the design (the system is externally mounted on the outside of the frame) of conventional technology, the harmonic drive system 1 for the pedal electric cycle of the design of the present invention may be covered in the frame 80 of the pedal electric cycle, therefore, the appearance of the aesthetic design may be enhanced in. Moreover, the harmonic drive reducer 45 has the characteristics of high reduction ratio, high meshing ratio, small size, light weight, low noise, and high transmission accuracy, so that battery endurance can be effectively improved, smoothness of the harmonic drive system 1 for the pedal electric cycle during operation can be enhanced, and comfort during riding can be enhanced.

Figure 8:
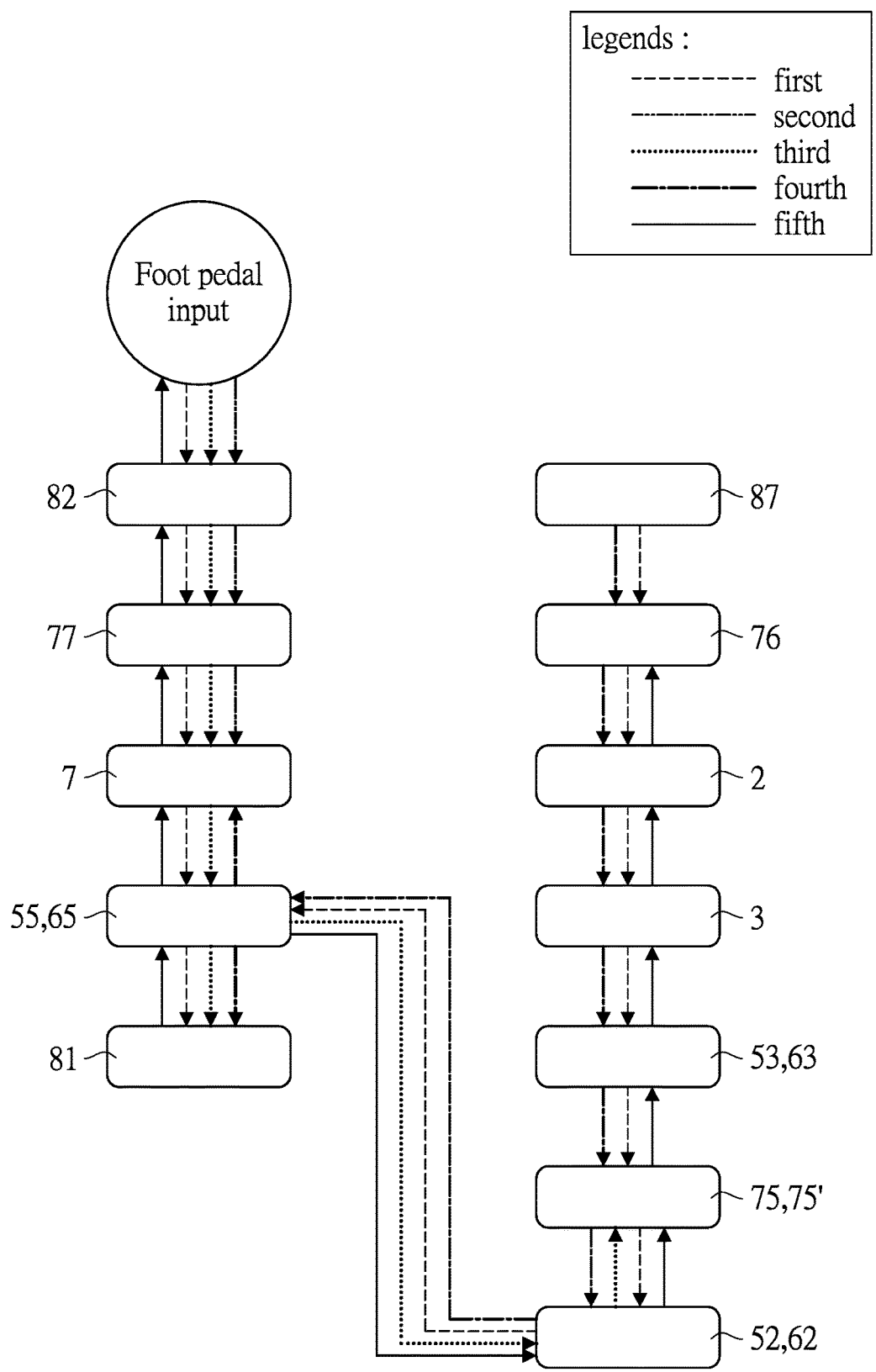
FIG. 8 is a flow diagram of five situational operation modes of harmonic drive system for pedal electric cycle of the present invention.

When riding or using the pedal electric cycle with the harmonic drive system 1 for the pedal electric cycle of the present invention, generally there are the following five situational operation modes. Please refer to FIG. 8, which shows a flow diagram of five situational operation modes of harmonic drive system for the pedal electric cycle of the present invention. In FIG. 8, the first arrow line, the second arrow line, the third arrow line, the fourth arrow line, and the fifth arrow line represent situational operation mode 1, situational operation mode 2, situational operation mode 3, situational operation mode 4, and situational operation mode 5, respectively. The direction of the arrow line represents the direction that drives the rotation. For example, the first arrow line between the spindle 82 and the torque sensor 77 represents that the spindle 82 drives the torque sensor 77 to rotate. The situational operation mode 1: the normal riding situation. When the user pedals forward such that the spindle 82 of the pedal electric cycle starts rotating forward, the torque sensor 77 senses a torque value. Then, according to the magnitude of the torque value, the electric motor 87 starts operating (the output torque of the electric motor 87 is corresponding to the magnitude of the torque value). Through the harmonic drive reducer 45, the first gear 50 and the second gear 55, the torque output from the output portion 57 of the direction-changing gear set 5 (the second end 591 of the second connecting shaft 59) to the sprocket 81 of the pedal electric cycle is increased, so as to reduce the burden on the user. (the user pedals forward, drives the spindle 82, drives the torque sensor 77, drives the first one-way clutch 7, drives the second gear 55, drives the sprocket 81; the electric motor 87 starts operating, drives the third one-way clutch 76, drives the wave generator 2, drives the flexible flexspline 3, drives the first connecting shaft 53, drives the second one-way clutch 75, drives the first gear teeth 52, drives the second gear 55, drives the sprocket 81)

The situational operation mode 2: the user pedals in reverse (drives the spindle 82 rotating in reverse). The first one-way clutch 7 now works to disengage the connection between the torque sensor 77 and the second connecting shaft 59 (that is that the connection between the spindle 82 and the second connecting shaft 59 is disengaged). Since now the torque value sensed by the torque sensor 77 is zero (due to no load), the electric motor 87 is stopped. (the user pedals in reverse, drives the spindle 82, drives the torque sensor 77; the first one-way clutch 7 disengages the connection between the torque sensor 77 and the second gear 55)

The situational operation mode 3: when the battery 89 is exhausted so that the electric motor 87 is stopped, or the electric motor 87 is switched off when the user does not want the electric motor 87 to output an assist force. If there is no such a second one-way clutch 75, then when the user pedals forward, the spindle 82 (rotating forward) will drive the second gear 55 rotating forward and such that the sprocket 81 rotates forward; and the second gear 55 will also drive the first gear 50 rotating and drive the harmonic drive reducer 45 rotating. However, the reduction ratio of the harmonic drive reducer 45 is very high; the user will feel very laborious when pedaling. Hence, in the situational operation mode 3, the second one-way clutch 75 of the harmonic drive system 1 for the pedal electric cycle of the present invention is needed. The second one-way clutch 75 disengages the connection between the first gear teeth 52 and the second end 531 of the first connecting shaft 53. Therefore, the load caused by the harmonic drive reducer 45 is eliminated when the user pedaling. (the user pedals forward, drives the spindle 82, drives the torque sensor 77, drives the first one-way clutch 7, drives the second gear 55, drives the sprocket 81 and the first gear teeth 52; the second one-way clutch 75 disengages the connection between the first gear teeth 52 and the first connecting shaft 53)

The situational operation mode 4: when emergency braking, the user stops pedaling, however, the electric motor 87 cannot completely stop immediately. Therefore, before the electric motor 87 is completely stopped, the electric motor 87 will still drive the harmonic drive reducer 45, the first gear 50, and the second gear 55 rotating and so that the spindle 82 is driven rotating for a short time period. Although it lasts only for a short time period, it may cause discomfort to the user. Hence, the first one-way clutch 7 of the harmonic drive system 1 for the pedal electric cycle of the present invention is needed. The first one-way clutch 7 disengages the connection between the torque sensor 77 and the second connecting shaft 59 (that is that the connection between the spindle 82 and the second connecting shaft 59 is disengaged) to prevent the user from discomfort. (the electric motor 87 still operating, drives the third one-way clutch 76, drives the wave generator 2, drives the flexible flexspline 3, drives the first connecting shaft 53, drives the second one-way clutch 75, drives the first gear teeth 52, drives the second gear 55, drives the sprocket 81; the first one-way clutch 7 disengages the connection between the second gear 55 and the torque sensor 77)

The situational operation mode 5: the user sometimes needs to walk the pedal electric cycle backwards, which will drive the sprocket 81 rotating in reverse. Since now the torque value sensed by the torque sensor 77 is zero (due to no load), the electric motor 87 is stopped. The sprocket 81 (rotating in reverse) drives the second gear 55 rotating in reverse, drives the spindle 82 rotating in reverse, and also drives the first gear 50 and the harmonic drive reducer 45 rotating in reverse. However, the electric motor 87 cannot rotate in reverse; hence, the third one-way clutch 76 is needed. The third one-way clutch 76 disengages the connection between the motor shaft 88 and the elliptical cam 20 to prevent from being locking up when walking the pedal electric cycle backwards, (the sprocket 81 rotating in reverse, drives the second gear 55, drives the first one-way clutch 7 and the first gear teeth 52; the first one-way clutch 7 drives the torque sensor 77, drives the spindle 82, drives the pedal; the first gear teeth 52 drives the second one-way clutch 75, drives the first connecting shaft 53, drives the flexible flexspline 3, drives the wave generator 2; the third one-way clutch 76 disengages the connection between the wave generator 2 and the electric motor 87)

In some preferred embodiments, a ratio of a second teeth number of the second gear teeth 58 to a first teeth number of the first gear teeth 52 is greater than or equal to 1 and less than or equal to 2.

In some preferred embodiments, a combination of the first gear teeth 52 and the second gear teeth 58 is one selected from the group consisting of: a combination of two bevel gears, a combination of two hypoid gears, a combination of a spur gear and a face gear, a combination of a worm wheel and a cylindrical worm, and a combination of a worm wheel and a hourglass worm.

The flexible-flexspline external gear teeth 34 have a flexible-flexspline teeth number. In some preferred embodiments, a meshing teeth number between the flexible-flexspline external gear teeth 34 and the rigid-circular-spline internal gear teeth 40 is greater than or equal to 15% of the flexible-flexspline teeth number and less than or equal to 30% of the flexible-flexspline teeth number.

In some preferred embodiments, the harmonic drive reducer 45 has a reduction ratio. The reduction ratio is greater than or equal to 20 and less than or equal to 50.

In some preferred embodiments, the flexible-flexspline external gear teeth 34 have a flexible-flexspline modulus. The inner "cylindrical" ring surface 26 of the flexible bearing 25 has a diameter. The elliptical cam 20 has a semi-major axis and a semi-minor axis, wherein the semi-major axis is greater than the semi-minor axis. The semi-major axis is greater than or equal to the sum of the diameter and 1.8 times the flexible-flexspline modulus, and less than or equal to the sum of the diameter and 2.4 times the flexible-flexspline modulus. The semi-minor axis is greater than or equal to the subtraction of 2.4 times the flexible-flexspline modulus from the diameter, and less than or equal to the subtraction of 1.8 times the flexible-flexspline modulus from the diameter.

In some preferred embodiments, a flange 22 can be used to connect the transmission gear device 10 and the transmission motor apparatus 86.

Figure 9:
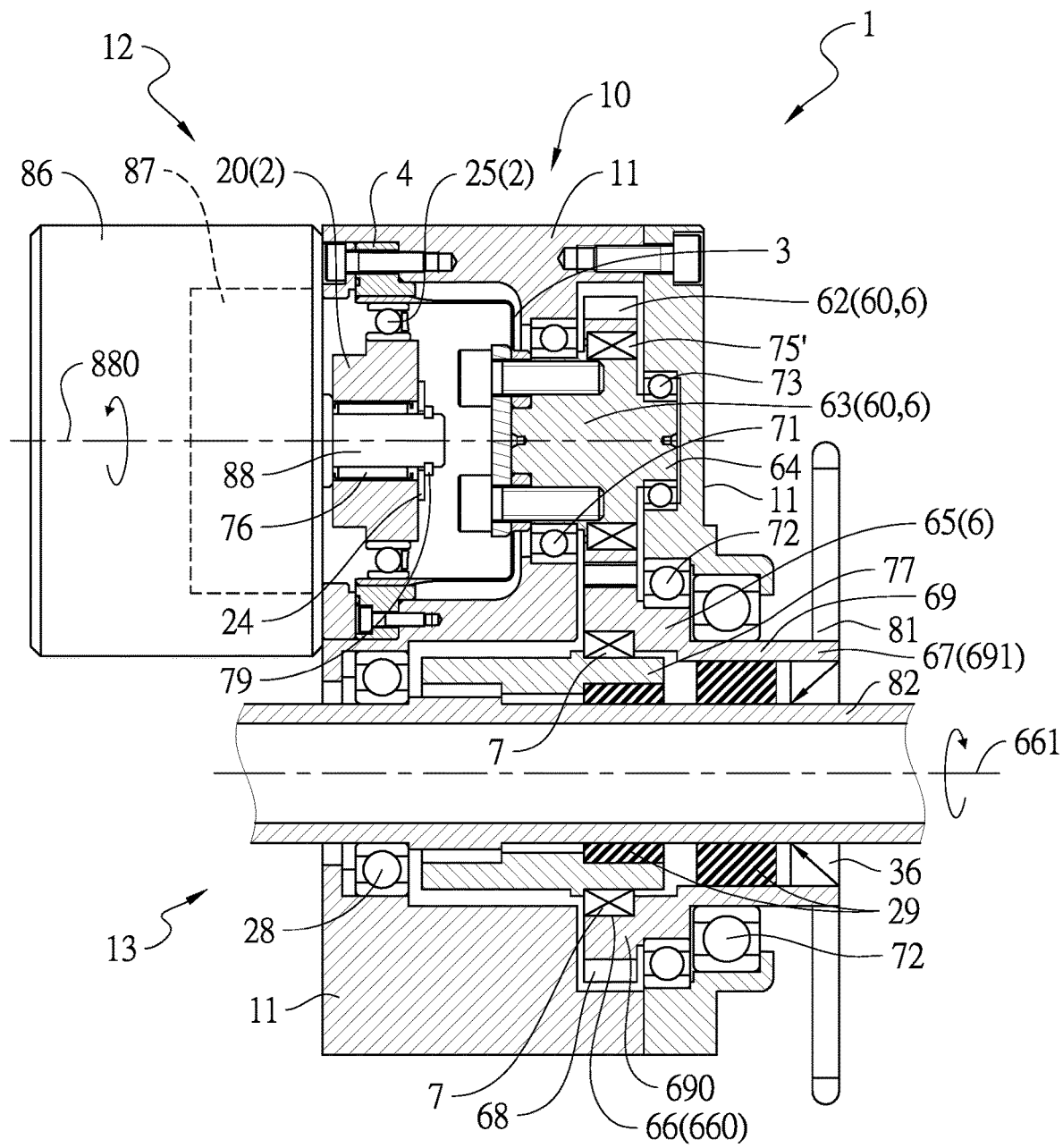
FIG. 9 is a cross-sectional schematic view of another embodiment of harmonic drive system for pedal electric cycle of the present invention.

Please refer to FIG. 9, which shows a cross-sectional schematic view of another embodiment of harmonic drive system for pedal electric cycle of the present invention. A harmonic drive system 1 for the pedal electric cycle of the present invention comprises a transmission gear device 10, a housing 11, and a transmission motor apparatus 86. The harmonic drive system 1 for the pedal electric cycle of the present invention is arranged in a frame 80 of the pedal electric cycle (please also refer to FIG. 11 or FIG. 12). The housing 11 is provided for containing the transmission gear device 10. The transmission motor apparatus 86 comprises an electric motor 87. The electric motor 87 is one selected from the group consisting of: a brushless DC motor and a brush DC motor. The electric motor 87 has a motor shaft 88. The motor shaft 88 rotates around a motor-shaft rotational axis 880. The transmission gear device 10 comprises a wave generator 2, a flexible flexspline 3, a rigid circular spline 4, a parallel-axis gear set 6, a first one-way clutch 7, a second one-way clutch 75', a third one-way clutch 76, a first bearing 71, two second bearings 72, a third bearing 73, a torque sensor 77, and an internal circlip 79. The wave generator 2 comprises an elliptical cam 20 and a flexible bearing 25.

Figure 3:
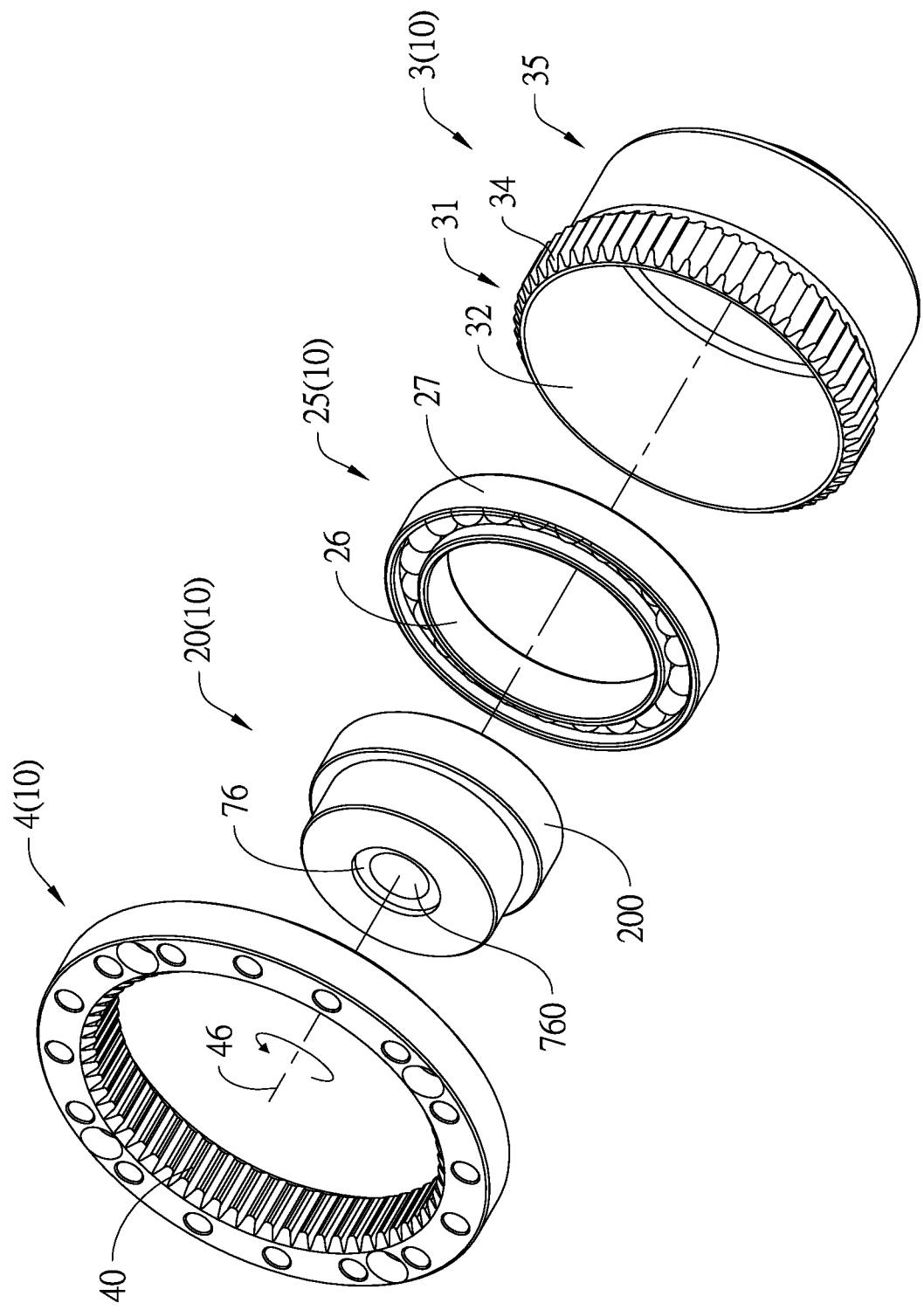
FIG. 3 is an exploded perspective view of elliptical cam, flexible bearing, flexible flexspline and rigid circular spline of the embodiment in FIG. 1.
Figure 4:
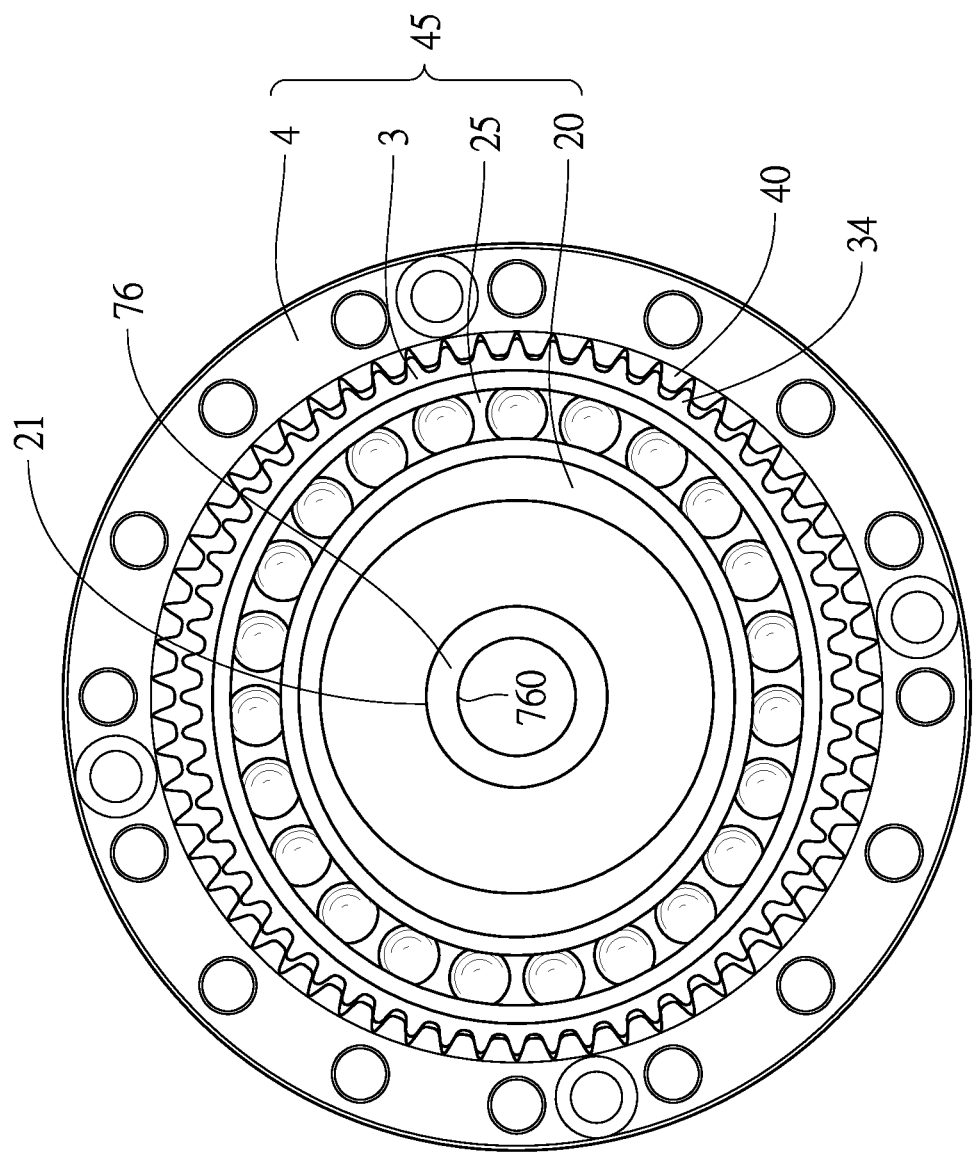
FIG. 4 is an assembled top view of elliptical cam, flexible bearing, flexible flexspline and rigid circular spline of the embodiment in FIG. 3.
Figure 5:
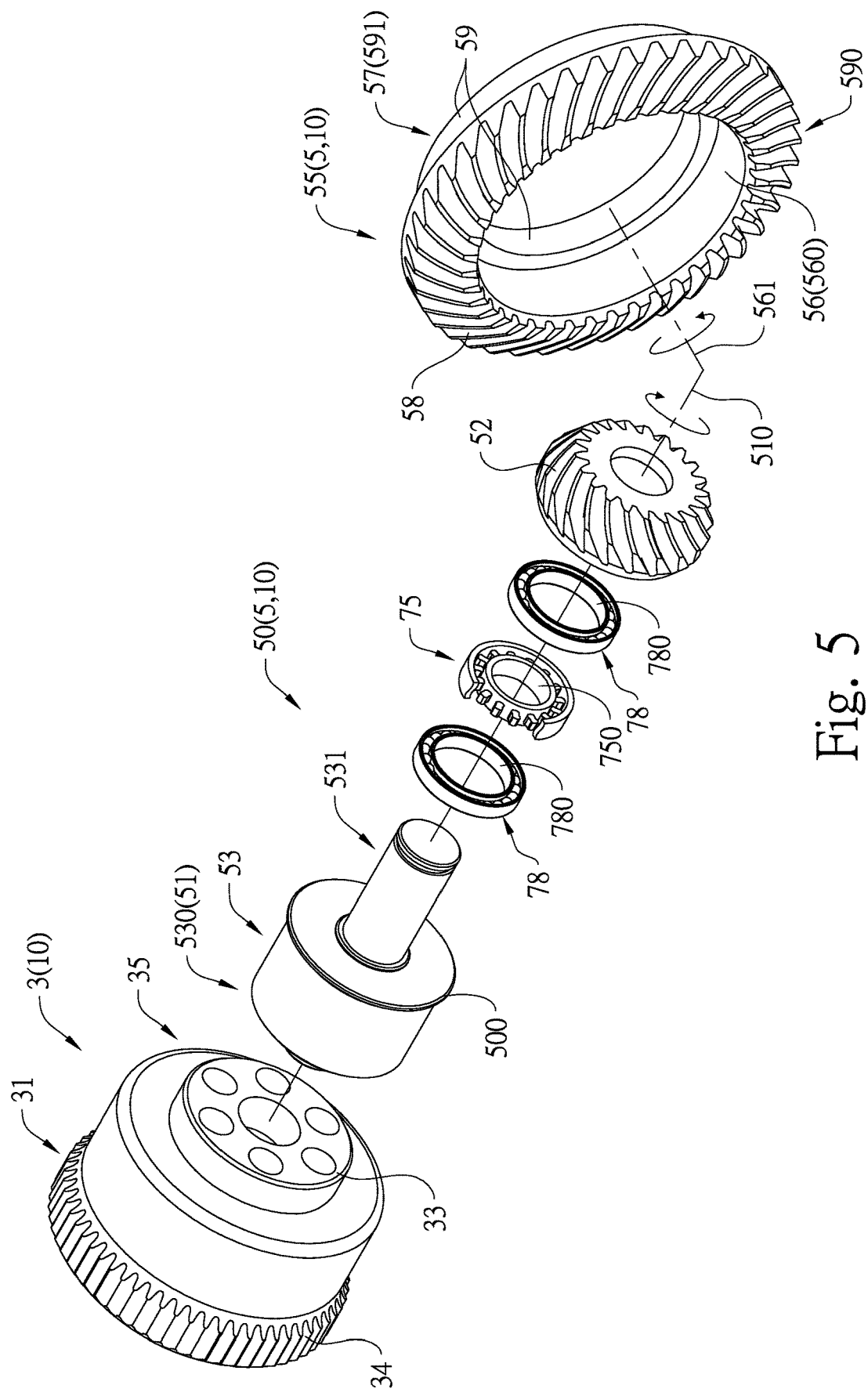
FIG. 5 is an exploded perspective view of flexible flexspline, first gear and second gear of the embodiment in FIG. 1.
Figure 10:
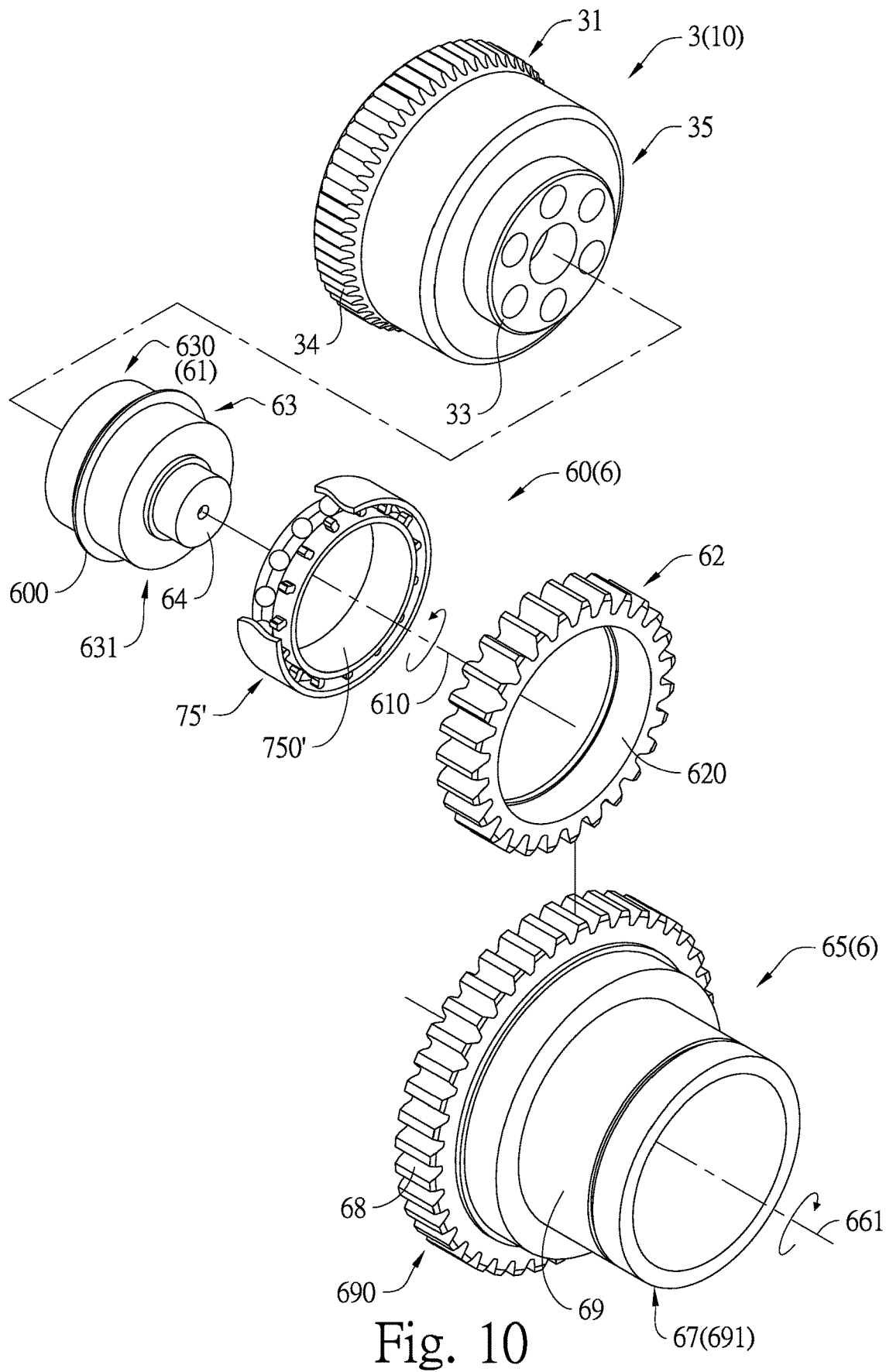
FIG. 10 is an exploded perspective view of flexible flexspline, first gear and second gear of the embodiment in FIG. 9.

Please also refer to FIG. 3 and FIG. 4. The flexible bearing 25 has an inner "cylindrical" ring surface 26. The elliptical cam 20 is arranged in a space defined by the inner "cylindrical" ring surface 26 of the flexible bearing 25. When the elliptical cam 20 is arranged in the space defined by the inner "cylindrical" ring surface 26 of the flexible hearing 25 (that is that an outer "elliptic cylindrical" ring surface 200 of the elliptical cam 20 is in contact with the inner "cylindrical" ring surface 26 of the flexible bearing 25), the "cylindrical" flexible bearing 25 is deformed into elliptic cylindrical, so that the wave generator 2 is assembled by the elliptical cam 20 and the flexible bearing 25. The flexible flexspline 3 has a first end 31 and a second end 35. The flexible flexspline 3 has a cup shape. The first end 31 of the flexible flexspline 3 is a cup mouth of the cup shape. The second end 35 of the flexible flexspline 3 is a cup bottom of the cup shape. The first end 31 of the flexible flexspline 3 has flexible-flexspline external gear teeth 34 and an inner "cylindrical" ring surface 32. When the wave generator 2 is arranged in a space defined by the inner "cylindrical" ring surface 32 of the flexible flexspline 3 (that is that an outer "elliptic cylindrical" ring surface 27 of the "elliptic cylindrical deformed" flexible bearing 25 is arranged in the space defined by the inner "cylindrical" ring surface 32 of the flexible flexspline 3), the "cylindrical" first end 31 of the flexible flexspline 3 is deformed into elliptic cylindrical. The rigid circular spline 4 has rigid-circular-spline internal gear teeth 40 provided for meshing with the flexible-flexspline external gear teeth 34. The rigid circular spline 4 is fixed at the housing 11. The housing 11 has an 8 shape. The wave generator 2 (including the elliptical cam 20 and the flexible bearing 25), the flexible flexspline 3, and the rigid circular spline 4 form a harmonic drive reducer 45. The elliptical cam 20 has an inner surface 21. The third one-way clutch 76 is arranged in a space defined by the inner surface 21 of the elliptical cam 20. The third one-way clutch 76 has an inner surface 760. At least a portion of the motor shaft 88 is arranged in a space defined by the inner surface 760 of the third one-way clutch 76 (the third one-way clutch 76 is connected to the motor shaft 88). The internal circlip 79 can fix the connection between the motor shaft 88, the third one-way clutch 76, and the elliptical cam 20 so as to prevent axial displacement. A washer 24 may further be added when using the internal circlip 79. The harmonic drive reducer 45 rotates around a harmonic-drive-reducer rotational axis 46. The harmonic-drive-reducer rotational axis 46 is coincident with the motor-shaft rotational axis 880. Please also refer to FIG. 10, Which shows an exploded perspective view of flexible flexspline, first gear and second gear of the embodiment in FIG. 9. The parallel-axis gear set 6 comprises a first gear 60 and a second gear 65. The first gear 60 comprises first gear teeth 62 and a first connecting shaft 63. The second gear 65 comprises second gear teeth 68 and a second connecting shaft 69. The parallel-axis gear set 6 has a first input portion 61, a second input portion 66, and an output portion 67. The first input portion 61 of the parallel-axis gear set 6 is disposed at a first end 630 of the first connecting shaft 63. A second end 631 of the first connecting shaft 63 is connected to the first gear teeth 62. The first gear teeth 62 have an inner ring surface 620. In current embodiment, the second one-way clutch 75' has an inner ring surface 750'. The second end 631 of the first connecting shaft 63 further comprises a connecting shaft protruding portion 64. The third bearing 73 has an inner ring surface. Firstly, the second end 631 of the first connecting shaft 63 is arranged in a space defined by the inner ring surface 750' of the second one-way clutch 75'. Then, the second one-way clutch 75' is arranged in a space defined by the inner ring surface 620 of the first gear teeth 62. And then, the connecting shaft protruding portion 64 is arranged in a space defined by the inner ring surface of the third bearing 73. The second one-way clutch 75' is one selected from the group consisting of: a roller type one-way clutch and a sprag type one-way clutch. The third bearing 73 is at least one selected from the group consisting of: a ball bearing, a roller bearing, and a needle bearing. The first input portion 61 of the parallel-axis gear set 6 (the first end 630 of the first connecting shaft 63) is connected to the second end 35 of the flexible flexspline 3. The second input portion 66 of the parallel-axis gear set 6 is disposed at a first end 690 of the second connecting shaft 69. The second input portion 66 of the parallel-axis gear set 6 has an inner surface 660. The first one-way clutch 7 is arranged in a space defined by the inner surface 660 of the second input portion 66 of the parallel-axis gear set 6. The first end 690 of the second connecting shaft 69 is connected to the second gear teeth 68. The first gear teeth 62 of the first gear 60 mesh with the second gear teeth 68 of the second gear 65. The output portion 67 of the parallel-axis gear set 6 is disposed at a second end 691 of the second connecting shaft 69. The output portion 67 of the parallel-axis gear set 6 (the second end 691 of the second connecting shaft 69) is provided for connecting to a sprocket 81 of the pedal electric cycle. The first one-way clutch 7 has an inner surface. At least a portion of the torque sensor 77 is arranged in a space defined by the inner surface of the first one-way clutch 7. The torque sensor 77 has an inner surface. At least a portion of a spindle 82 of the pedal electric cycle is arranged in a space defined by the inner surface of the torque sensor 77. In addition, a bearing 28 and a copper sleeve 29 may further be used such that at least a portion of the spindle 82 is arranged in the space defined by the inner surface of the torque sensor 77, a space defined by an inner ring surface of the bearing 28, and a space defined by an inner ring surface of the copper sleeve 29. Therefore, the rotation of the spindle 82 is more stable and axial displacement is prevented. The first input portion 61 of the parallel-axis gear set 6 (the first end 630 of the first connecting shaft 63) rotates around a first-input rotational axis 610. The second input portion 66 of the parallel-axis gear set 6 (the first end 690 of the second connecting shaft 69) rotates around a second-input rotational axis 661. The first-input rotational axis 610 is coincident with the harmonic-drive-reducer rotational axis 46 and also coincident with the motor-shaft rotational axis 880. The first-input rotational axis 610 and the second-input rotational axis 661 are parallel, but the first-input rotational axis 610 and the second-input rotational axis 661 are non-coincident. The flexible flexspline 3 further comprises a fixing portion 33. The first gear 60 further comprises a fixing portion 600 (disposed at the first connecting shaft 63). The first bearing 71 has an inner ring surface and an inner ring. Before the first input portion 61 of the parallel-axis gear set 6 (the first end 630 of the first connecting shaft 63) is connected to the second end 35 of the flexible flexspline 3, a portion of the first connecting shaft 63 between the first input portion 61 of the parallel-axis gear set 6 (the first end 630 of the first connecting shaft 63) and the fixing portion 600 may be arranged in a space defined by the inner ring surface of the first bearing 71; and then the first input portion 61 of the parallel-axis gear set 6 (the first end 630 of the first connecting shaft 63) may be connected to the second end 35 of the flexible flexspline 3. Therefore, the inner ring of the first bearing 71 is fixed between the fixing portion 33 of the flexible flexspline 3 and the fixing portion 600 of the first gear 60. The axial displacement of the first bearing 71 may be prevented. The first bearing 71 is at least one selected from the group consisting of: a ball bearing, a roller bearing, and a needle bearing, wherein the ball bearing may be a deep groove ball bearing. Each of the second bearings 72 has an inner ring surface. At least a portion of the second connecting shaft 69 of the second gear 65 is arranged in two spaces defined respectively by the inner ring surfaces of the two second bearings 72. The second bearing 72 is at least one selected from the group consisting of: a ball bearing, a roller bearing, and a needle bearing, wherein the ball bearing may be a deep groove ball bearing. A sealing element 36 may further be used for sealing a gap between the spindle 82 and the output portion 67 of the parallel-axis gear set 6 (the second end 691 of the second connecting shaft 69).

Figure 11:
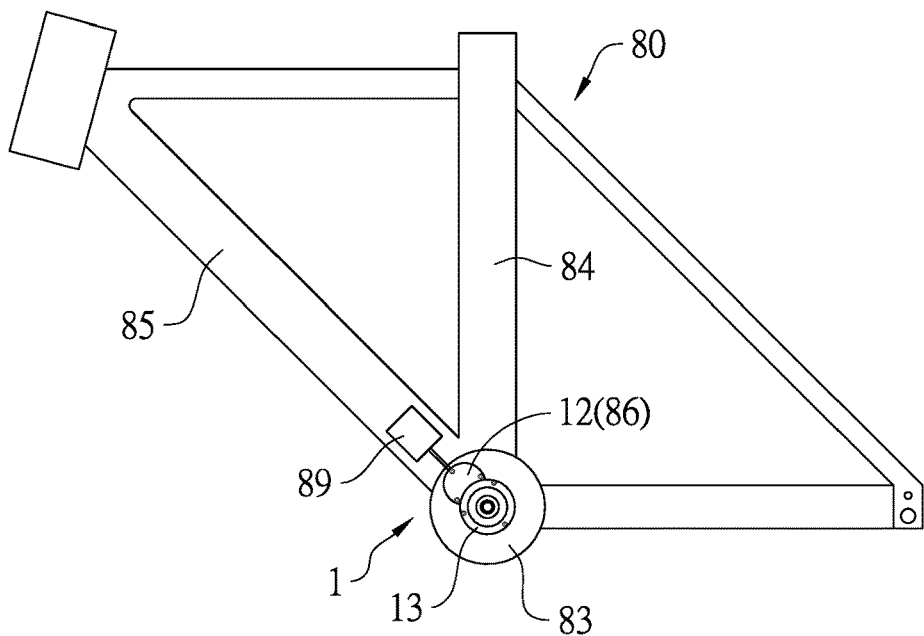
FIG. 11 is a cross-sectional schematic view of an embodiment of harmonic drive system for pedal electric cycle arranged in a frame of pedal electric cycle of the present invention.

Please refer to FIG. 11, which shows a cross-sectional schematic view of an embodiment of harmonic drive system for pedal electric cycle arranged in a frame of pedal electric cycle of the present invention. In current embodiment, the harmonic drive system 1 for the pedal electric cycle further comprises a battery 89, wherein the battery 89 is electrically connected to the transmission motor apparatus 86. The battery 89 may be a rechargeable battery. The harmonic drive system 1 for the pedal electric cycle is disposed in a bottom bracket 83 of the frame 80; wherein the battery 89 is disposed in the seat tube 84 of the frame 80.

Figure 12:
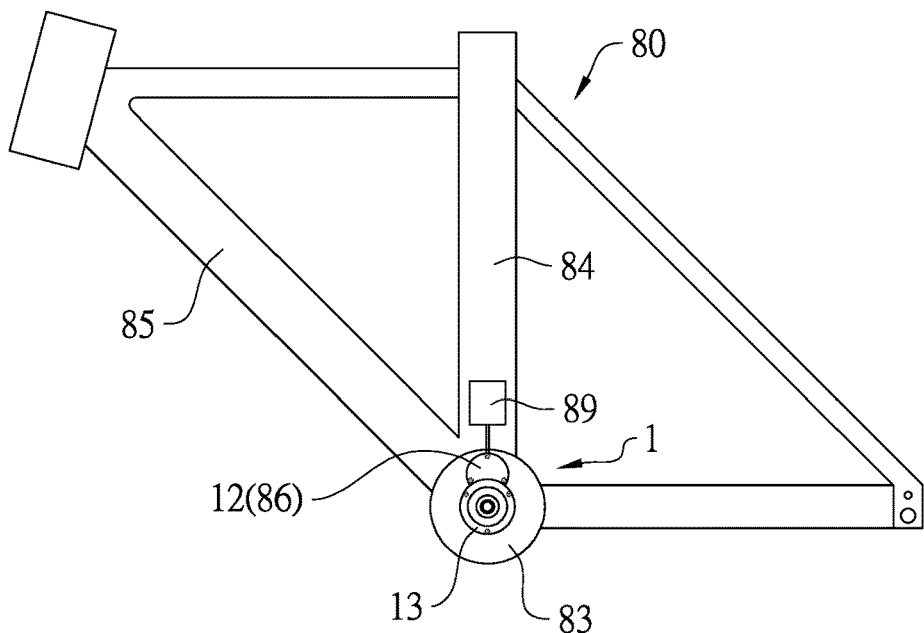
FIG. 12 is a cross-sectional schematic view of another embodiment of harmonic drive system for pedal electric cycle arranged in a frame of pedal electric cycle of the present invention.
Figure 14:
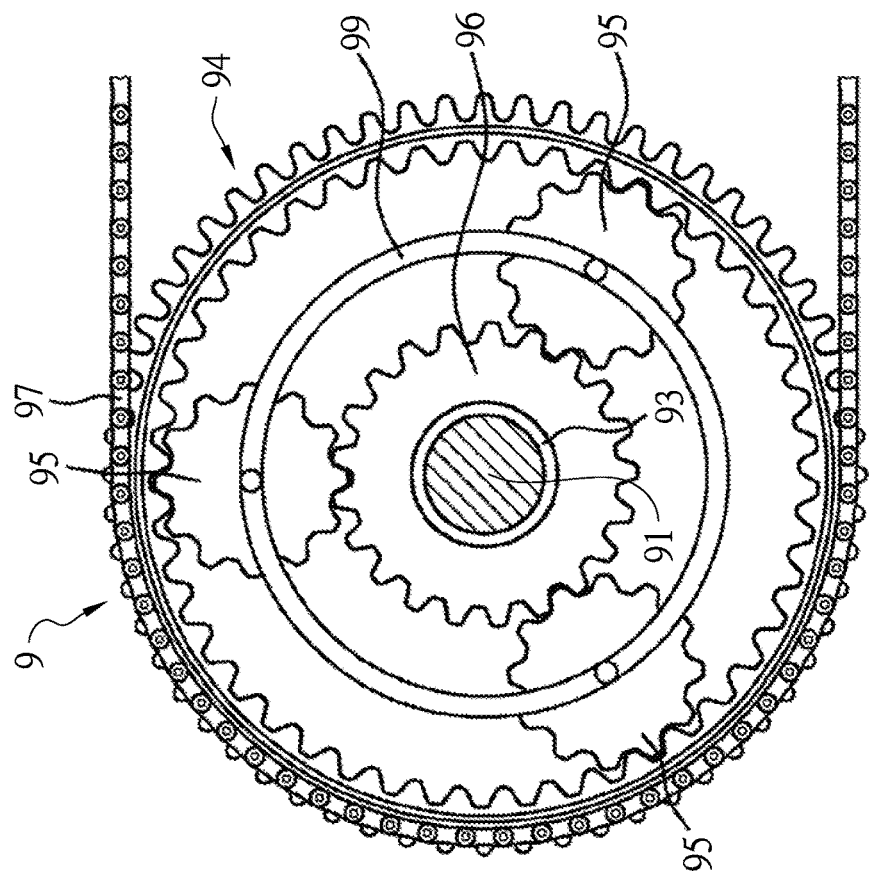
FIG. 14 is a schematic diagram of partial enlarged view of the embodiment in FIG. 13.
Figure 13:
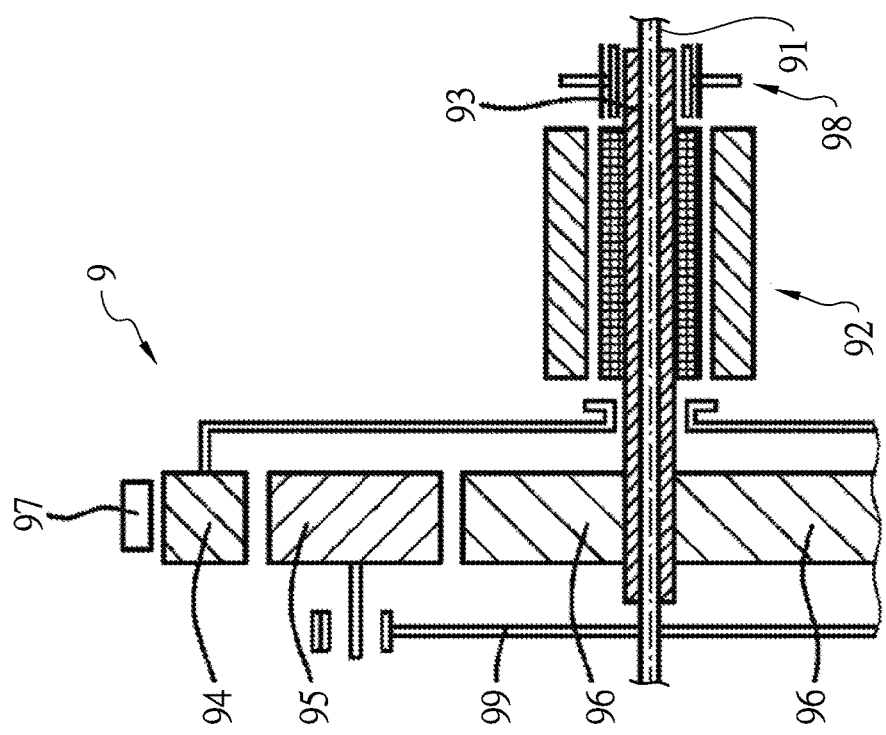
FIG. 13 is a cross-sectional schematic view of an embodiment of planetary gear transmission apparatus of pedal electric cycle of the conventional technology.

Please refer to FIG. 12, which shows a cross-sectional schematic view of another embodiment of harmonic drive system for pedal electric cycle arranged in a frame of pedal electric cycle of the present invention. In current embodiment, the harmonic drive system 1 for the pedal electric cycle further comprises a battery 89, wherein the battery 89 is electrically connected to the transmission motor apparatus 86. The battery 89 may be a rechargeable battery. The harmonic drive system 1 for the pedal electric cycle is disposed in a bottom bracket 83 of the frame 80; wherein the battery 89 is disposed in the down tube 85 of the frame 80.

The harmonic drive system 1 for the pedal electric cycle of the present invention uses the reducer structure of the parallel-axis gear set 6 (including two bevel gears: the first gear 60 and the second gear 65) combining with the reducer structure of the harmonic drive reducer 45. It can significantly reduce the volume and the weight of the harmonic drive system 1 for the pedal electric cycle. Furthermore, the harmonic drive system 1 for the pedal electric cycle can be designed and arranged in the bottom bracket 83 of the frame 80 of the pedal electric cycle. Compared with the design (the system is externally mounted on the outside of the frame) of conventional technology, the harmonic drive system 1 for the pedal electric cycle of the design of the present invention may be covered in the frame 80 of the pedal electric cycle, therefore, the appearance of the aesthetic design may be enhanced in. Moreover, the harmonic drive reducer 45 has the characteristics of high reduction ratio, high meshing ratio, small size, light weight, low noise, and high transmission accuracy, so that battery endurance can be effectively improved, smoothness of the harmonic drive system 1 for the pedal electric cycle during operation can be enhanced, and comfort during riding can be enhanced.

When riding or using the pedal electric cycle with the harmonic drive system 1 for the pedal electric cycle of the present invention, generally there are the following five situational operation modes. Please refer to FIG. 8. The situational operation mode 1: the normal riding situation. When the user pedals forward such that the spindle 82 of the pedal electric cycle starts rotating forward, the torque sensor 77 senses a torque value. Then, according to the magnitude of the torque value, the electric motor 87 starts operating (the output torque of the electric motor 87 is corresponding to the magnitude of the torque value). Through the harmonic drive reducer 45, the first gear 60 and the second gear 65, the torque output from the output portion 67 of the parallel-axis gear set 6 (the second end 691 of the second connecting shaft 69) to the sprocket 81 of the pedal electric cycle is increased, so as to reduce the burden on the user. (the user pedals forward, drives the spindle 82, drives the torque sensor 77, drives the first one-way clutch 7, drives the second gear 65, drives the sprocket 81; the electric motor 87 starts operating, drives the third one-way clutch 76, drives the wave generator 2, drives the flexible flexspline 3, drives the first connecting shaft 63, drives the second one-way clutch 75', drives the first gear teeth 62, drives the second gear 65, drives the sprocket 81)

The situational operation mode 2: the user pedals in reverse (drives the spindle 82 rotating in reverse). The first one-way clutch 7 now works to disengage the connection between the torque sensor 77 and the second connecting shaft 69 (that is that the connection between the spindle 82 and the second connecting shaft 69 is disengaged). Since now the torque value sensed by the torque sensor 77 is zero (due to no load), the electric motor 87 is stopped. (the user pedals in reverse, drives the spindle 82, drives the torque sensor 77; the first one-way clutch 7 disengages the connection between the torque sensor 77 and the second gear 65)

The situational operation mode 3: when the battery 89 is exhausted so that the electric motor 87 is stopped, or the electric motor 87 is switched off when the user does not want the electric motor 87 to output an assist force. If there is no such a second one-way clutch 75', then when the user pedals forward, the spindle 82 (rotating forward) will drive the second gear 65 rotating forward and such that the sprocket 81 rotates forward; and the second gear 65 will also drive the first gear 60 rotating and drive the harmonic drive reducer 45 rotating. However, the reduction ratio of the harmonic drive reducer 45 is very high; the user will feel very laborious when pedaling. Hence, in the situational operation mode 3, the second one-way clutch 75' of the harmonic drive system 1 for the pedal electric cycle of the present invention is needed. The second one-way clutch 75' disengages the connection between the first gear teeth 62 and the second end 631 of the first connecting shaft 63. Therefore, the load caused by the harmonic drive reducer 45 is eliminated when the user pedaling. (the user pedals forward, drives the spindle 82, drives the torque sensor 77, drives the first one-way clutch 7, drives the second gear 65, drives the sprocket 81 and the first gear teeth 62; the second one-way clutch 75' disengages the connection between the first gear teeth 62 and the first connecting shaft 63)

The situational operation mode 4: when emergency braking, the user stops pedaling, however, the electric motor 87 cannot completely stop immediately. Therefore, before the electric motor 87 is completely stopped, the electric motor 87 will still drive the harmonic drive reducer 45, the first gear 60, and the second gear 65 rotating and so that the spindle 82 is driven rotating for a short time period. Although it lasts only for a short time period, it may cause discomfort to the user. Hence, the first one-way clutch 7 of the harmonic drive system 1 for the pedal electric cycle of the present invention is needed. The first one-way clutch 7 disengages the connection between the torque sensor 77 and the second connecting shaft 69 (that is that the connection between the spindle 82 and the second connecting shaft 69 is disengaged) to prevent the user from discomfort. (the electric motor 87 still operating, drives the third one-way clutch 76, drives the wave generator 2, drives the flexible flexspline 3, drives the first connecting shaft 63, drives the second one-way clutch 75', drives the first gear teeth 62, drives the second gear 65, drives the sprocket 81; the first one-way clutch 7 disengages the connection between the second gear 65 and the torque sensor 77)

The situational operation mode 5: the user sometimes needs to walk the pedal electric cycle backwards, which will drive the sprocket 81 rotating in reverse. Since now the torque value sensed by the torque sensor 77 is zero (due to no load), the electric motor 87 is stopped. The sprocket 81 (rotating in reverse) drives the second gear 65 rotating in reverse, drives the spindle 82 rotating in reverse, and also drives the first gear 60 and the harmonic drive reducer 45 rotating in reverse. However, the electric motor 87 cannot rotate in reverse; hence, the third one-way clutch 76 is needed. The third one-way clutch 76 disengages the connection between the motor shaft 88 and the elliptical cam 20 to prevent from being locking up when walking the pedal electric cycle backwards, (the sprocket 81 rotating in reverse, drives the second gear 65, drives the first one-way clutch 7 and the first gear teeth 62; the first one-way clutch 7 drives the torque sensor 77, drives the spindle 82, drives the pedal: the first gear teeth 62 drives the second one-way clutch 75', drives the first connecting shaft 63, drives the flexible flexspline 3, drives the wave generator 2; the third one-way clutch 76 disengages the connection between the wave generator 2 and the electric motor 87)

In some preferred embodiments, the third one-way clutch 76 is a one-way roller bearing.

In some preferred embodiments, a ratio of a second teeth number of the second gear teeth 68 to a first teeth number of the first gear teeth 62 is greater than or equal to 1 and less than or equal to 2.

In some preferred embodiments, a combination of the first gear teeth 62 and the second gear teeth 68 is one selected from the group consisting of: a combination of two spur gears, a combination of two helical gears, and a combination of a spur gear and an internal gear.

The flexible-flexspline external gear teeth 34 have a flexible-flexspline teeth number. In some preferred embodiments, a meshing teeth number between the flexible-flexspline external gear teeth 34 and the rigid-circular-spline internal gear teeth 40 is greater than or equal to 15% of the flexible-flexspline teeth number and less than or equal to 30% of the flexible-flexspline teeth number.

In some preferred embodiments, the harmonic drive reducer 45 has a reduction ratio. The reduction ratio is greater than or equal to 20 and less than or equal to 50.

In some preferred embodiments, the flexible-flexspline external gear teeth 34 have a flexible-flexspline modulus. The inner "cylindrical" ring surface 26 of the flexible bearing 25 has a diameter. The elliptical cam 20 has a semi-major axis and a semi-minor axis, wherein the semi-major axis is greater than the semi-minor axis. The semi-major axis is greater than or equal to the sum of the diameter and 1.8 times the flexible-flexspline modulus, and less than or equal to the sum of the diameter and 2.4 times the flexible-flexspline modulus. The semi-minor axis is greater than or equal to the subtraction of 2.4 times the flexible-flexspline modulus from the diameter, and less than or equal to the subtraction of 1.8 times the flexible-flexspline modulus from the diameter.

As disclosed in the above description and attached drawings, the present invention can provide a harmonic drive system for a pedal electric cycle. It is new and can be put into industrial use.

Although the embodiments of the present invention have been described in detail, many modifications and variations may be made by those skilled in the art from the teachings disclosed hereinabove. Therefore, it should be understood that any modification and variation equivalent to the spirit of the present invention be regarded to fall into the scope defined by the appended claims.

What is claimed is:

1. A harmonic drive system for a pedal electric cycle, wherein said harmonic drive system is arranged in a frame of said pedal electric cycle, said harmonic drive system comprises:
a transmission gear device, which comprises:
a wave generator, which comprises:
an elliptical cam; and
a flexible bearing having an inner ring surface, wherein said elliptical cam is arranged in a space defined by said inner ring surface of said flexible bearing such that said flexible bearing is deformed into elliptic cylindrical;
a flexible flexspline having a first end and a second end, wherein said first end of said flexible flexspline has flexible-flexspline external gear teeth and an inner ring surface, wherein said wave generator is arranged in a space defined by said inner ring surface of said first end of said flexible flexspline such that said first end of said flexible flexspline is deformed into elliptic cylindrical, wherein said flexible flexspline comprises a fixing portion;
a rigid circular spline having rigid-circular-spline internal gear teeth provided for meshing with said flexible-flexspline external gear teeth;
a gear set having a first input portion, a second input portion, and an output portion, wherein said first input portion of said gear set is connected to said second end of said flexible flexspline, said second input portion of said gear set has an inner surface, said output portion of said gear set is provided for connecting to a sprocket of said pedal electric cycle, wherein said first input portion of said gear set has a first-input rotational axis, said second input portion of said gear set has a second-input rotational axis, wherein said gear set comprises:
a first gear, which comprises:
first gear teeth;
a first connecting shaft, wherein said first input portion of said gear set is disposed at a first end of said first connecting shaft, a second end of said first connecting shaft is connected to said first gear; and
a fixing portion; and
a second gear, which comprises:
second gear teeth; and
a second connecting shaft, wherein said second input portion of said gear set is disposed at a first end of said second connecting shaft, said first end of said second connecting shaft is connected to said second gear, said output portion of said gear set is disposed at a second end of said second connecting shaft, wherein said first gear teeth of said first gear mesh with said second gear teeth of said second gear;
at least one first bearing, wherein said at least one first bearing has an inner ring surface and an inner ring, at least a portion of said first connecting shaft of said first gear is arranged in a space defined by said inner ring surface of said at least one first bearing, wherein said inner ring of said at least one first bearing is fixed between said fixing portion of said flexible flexspline and said fixing portion of said first gear; and
a first one-way clutch arranged in a space defined by said inner surface of said second input portion of said gear set, wherein said first one-way clutch has an inner surface, at least a portion of a spindle of said pedal electric cycle is arranged in a space defined by said inner surface of said first one-way clutch.

2. The harmonic drive system for the pedal electric cycle according to claim 1, further comprising a transmission motor apparatus, wherein said transmission motor apparatus comprises an electric motor, said electric motor has a motor shaft, wherein said elliptical cam is connected to said motor shaft.

3. The harmonic drive system for the pedal electric cycle according to claim 2, further comprising a rechargeable battery, wherein said rechargeable battery is electrically connected to said transmission motor apparatus.

4. The harmonic drive system for the pedal electric cycle according to claim 2, wherein said motor shaft has a motor-shaft rotational axis coincident with said first-input rotational axis.

5. The harmonic drive system for the pedal electric cycle according to claim 4, wherein said wave generator, said flexible flexspline, and said rigid circular spline form a harmonic drive reducer, wherein said harmonic drive reducer has a harmonic-drive-reducer rotational axis coincident with said first-input rotational axis.

6. The harmonic drive system for the pedal electric cycle according to claim 1, wherein said transmission gear device further comprises a second one-way clutch, wherein said second one-way clutch has an inner ring surface, said second end of said first connecting shaft is arranged in a space defined by said inner ring surface of said second one-way clutch, wherein said first gear teeth have an inner ring surface, said second one-way clutch is arranged in a space defined by said inner ring surface of said first gear teeth.

7. The harmonic drive system for the pedal electric cycle according to claim 6, wherein said second one-way clutch is one selected from the group consisting of: a roller type one-way clutch and a sprag type one-way clutch.

8. The harmonic drive system for the pedal electric cycle according to claim 2, wherein said transmission gear device further comprises a third one-way clutch, wherein said elliptical cam has an inner surface, said third one-way clutch is arranged in a space defined by said inner surface of said elliptical cam, wherein said elliptical cam is connected to said motor shaft through said third one-way clutch.

9. The harmonic drive system for the pedal electric cycle according to claim 1, wherein said transmission gear device further comprises a third one-way clutch, wherein said elliptical cam has an inner surface, said third one-way clutch is arranged in a space defined by said inner surface of said elliptical cam.

10. The harmonic drive system for the pedal electric cycle according to claim 1, further comprising a housing, wherein said housing is provided for containing said transmission gear device, said rigid circular spline is fixed at said housing.

11. The harmonic drive system for the pedal electric cycle according to claim 1, wherein an angle between said first-input rotational axis and said second-input rotational axis is 90 degrees.

12. The harmonic drive system for the pedal electric cycle according to claim 1, wherein said first-input rotational axis and said second-input rotational axis are parallel.

13. The harmonic drive system for the pedal electric cycle according to claim 1, wherein said first-input rotational axis and said second-input rotational axis are non-parallel, a combination of said first gear teeth and said second gear teeth is one selected from the group consisting of: a combination of two bevel gears, a combination of two hypoid gears, a combination of a spur gear and a face gear, a combination of a worm wheel and a cylindrical worm, and a combination of a worm wheel and an hourglass worm.

14. The harmonic drive system for the pedal electric cycle according to claim 1, wherein said first-input rotational axis and said second-input rotational axis are parallel, a combination of said first gear teeth and said second gear teeth is one selected from the group consisting of: a combination of two spur gears, a combination of two helical gears, and a combination of a spur gear and an internal gear.

15. The harmonic drive system for the pedal electric cycle according to claim 1, wherein said first-input rotational axis and said second-input rotational axis are parallel, wherein said transmission gear device further comprises at least one third bearing, said second end of said first connecting shaft further comprises a connecting shaft protruding portion, wherein said at least one third bearing has an inner ring surface, said connecting shaft protruding portion is arranged in a space defined by said inner ring surface of said at least one third bearing.

16. The harmonic drive system for the pedal electric cycle according to claim 15, wherein said at least one third bearing is at least one selected from the group consisting of: a ball bearing, a roller bearing, and a needle bearing.

17. The harmonic drive system for the pedal electric cycle according to claim 1, wherein said at least one first bearing is at least one selected from the group consisting of: a ball bearing, a roller bearing, and a needle bearing.

18. The harmonic drive system for the pedal electric cycle according to claim 1, wherein said transmission gear device further comprises at least one second bearing, wherein said at least one second bearing has an inner ring surface, at least a portion of said second connecting shaft of said second gear is arranged in a space defined by said inner ring surface of said at least one second bearing.

19. The harmonic drive system for the pedal electric cycle according to claim 18, wherein said at least one second bearing is at least one selected from the group consisting of: a ball bearing, a roller bearing, and a needle bearing.

20. The harmonic drive system for the pedal electric cycle according to claim 1, wherein said wave generator, said flexible flexspline, and said rigid circular spline form a harmonic drive reducer, wherein said harmonic drive reducer has a harmonic-drive-reducer rotational axis coincident with said first-input rotational axis.

21. The harmonic drive system for the pedal electric cycle according to claim 1, wherein one end of said harmonic drive system close to said wave generator is disposed in a seat tube of said frame or a down tube of said frame; while the other end of said harmonic drive system distant from said wave generator is disposed in a bottom bracket of said frame.

22. The harmonic drive system for the pedal electric cycle according to claim 1, wherein said first-input rotational axis and said second-input rotational axis are parallel, said harmonic drive system is disposed in a bottom bracket of said frame.

23. The harmonic drive system for the pedal electric cycle according to claim 1, wherein said flexible flexspline has a cup shape, wherein said first end of said flexible flexspline is a cup mouth of said cup shape, said second end of said flexible flexspline is a cup bottom of said cup shape.

24. The harmonic drive system for the pedal electric cycle according to claim 1, wherein said transmission gear device further comprises a torque sensor, at least a portion of said torque sensor is arranged in a space defined by said inner surface of said first one-way clutch, wherein said torque sensor has an inner surface, said portion of said spindle of said pedal electric cycle is arranged in a space defined by said inner surface of said torque sensor.

\* \* \* \* \*